United States Patent Office 3,719,626
Patented Mar. 6, 1973

3,719,626
CURABLE AQUEOUS MIXTURE OF (1) ADDUCT OF POLYGLYCIDYL ETHER AND ALLYLAMINE AND (2) CARBOXYLIC ACID
Clayton A. May, Orinda, Calif., assignor to Shell Oil Company, New York, N.Y.
No Drawing. Filed Oct. 9, 1969, Ser. No. 865,178
Int. Cl. B01k 5/02; C08g 30/08
U.S. Cl. 260—29.2 EP    2 Claims

ABSTRACT OF THE DISCLOSURE

An adduct of a polyepoxide and an ethylenically unsaturated amine is dispersed in water with an organic acid to provide cathodic electrodepositable coating compositions. Allyl amine and diallyl amine are preferred, and $R_1$—CH=CH—$CH_2$—NHR is disclosed. The adduct may further be reacted with additional polyepoxide, the product being dispersible and film forming.

Water-thinnable paint binders are usually prepared by preparing a resin containing free carboxyl groups and by neutralizing the resin completely or partially with an alkaline material, such as a nitrogen base. For instance, British Pat. No. 962,974 discloses a process wherein a polyepoxide is completely esterified with linseed oil fatty acids and the resulting product is reacted with maleic anhydride at 240° C. to introduce free carboxyl groups; the maleinized resin is then solubilized in water by neutralization with ammonia and addition of ethylene glycol monobutyl ether (butyl Cellosolve) and used as a paint binder.

The use of water-thinnable paint binders and paints is at present well-established. One of the advantages is that they offer the possibility for electrodeposition from solution onto metals to form a pore-free coating in thin layers, even at places difficult to reach with spray gun or brush. The coating compositions described above are adopted for anodic deposition. They typically utilize resins having free carboxyl groups or other anionic groups in their polymeric structure. Dispersion of these resins in water can be effected by the addition of a suitably basic material such as ammonia, water soluble amines or alkalis.

The present invention contemplates coating compositions adapted for cathodic depositions. Resins which will coat at the cathode are those resins having free amine or substituted-amine groups, for example, quaternary ammonium groups in their resin structure. Aqueous dispersion of these resins can be effected by the addition of suitably acidic materials such as water soluble carboxylic acids, e.g., formic acid, acetic acid, propionic acid, chloropropionic acid, etc., and suitably buffered forms of certain inorganic acids, e.g., phosphoric. Cathodic coatings have a number of attractive features, among these being lack of metal dissolution from the article being coated, and the resulting lighter color of the coating. This is a significant consideration in applications where color is important such as in the coating of metal appliances, furniture and fixtures. Another advantage is the improvement in corrosion resistance, since the metal surface is passivated during coating.

The present invention is directed towards a curable composition comprising an adduct of a polyepoxide and an ethylenically unsaturated amine. More particularly the present invention is directed towards a composition suitable for electrodeposition comprising an aqueous mixture of (1) an adduct of a polyepoxide and an ethylenically unsaturated amine and (2) a water soluble carboxylic acid.

The present invention may also be described as a process for cathodic electrodeposition comprising:

(A) immersing a body capable of carrying an electric current in a composition comprising an aqueous mixture of (1) an adduct of a polyepoxide and an ethylenically unsaturated amine and (2) a water soluble carboxylic acid, (B) passing an electric current through the aqueous composition and through said body to deposit a uniform insoluble film thereon, and (C) curing said film.

The present invention may also be described as an article of manufacture comprising a body capable of carrying an electric current coated uniformly with a composition comprising an aqueous mixture of (1) an adduct of a polyepoxide and an ethylenically unsaturated amine and (2) a water soluble carboxylic acid.

POLYEPOXIDES

The polyepoxides to be used in preparing the present invention are described in substantial detail in U.S. Pat. No. 2,956,034 to Simpson. Briefly, they comprise the organic compounds possessing more than one vicinal epoxy group, i.e., more than one

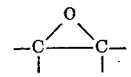

group, per molecule. These compounds may be saturated or unsaturated, aliphatic, cycloaliphatic, aromatic or heterocyclic and may be substituted with substituents such as chlorine, hydroxyl groups, ether radicals and the like. They may be monomeric or polymeric.

For clarity, many of the polyepoxides and particularly those of the polymeric type are described in terms of "epoxy equivalent" values. This expression refers to the average of the number of epoxy groups per molecule. The epoxy equivalent value is obtained by dividing the average molecule weight of the polyepoxide by the epoxide equivalent weight. The epoxide equivalent weight is determined by heating a sample of the polyepoxide with an excess of pyridinium chloride dissolved in pyridine at the boiling point and then back-titrating the excess pyridinium chloride with 0.1 N sodium hydroxide to the phenolphthalein end point. The epoxide value is calculated by considering one HCl as equivalent to one epoxide group. This method is used to obtain epoxide equivalent values referred to herein.

If the polyepoxide material is a single compound having all of the epoxy groups intact, the epoxy equivalent value will be an integer. In the case of polymeric polyepoxides the material may contain some of the monomeric epoxide or have some of the epoxy groups hydrated or otherwise reacted and/or contain macromolecules of various molecular weights. In this case the epoxy equivalent may be a fractional value and may be only slightly higher than 1. Another suitable description of the epoxide content of an epoxy compound is in terms of epoxy equivalents per 100 grams.

Detailed discussion of polyepoxides suitable for use in this invention is found in the Simpson patent and in U.S. Pat. No. 2,633,458 to Shokal. So much of the disclosures of the Shokal patent as is relative to examples of polyepoxides is incorporated by reference into this specification.

Suitable monomeric polyepoxide compounds include diepoxidized alkadienes, diepoxidized alkenylcyclohexenes, diglycidyl ethers of dihydroxy aromatics and other polyglycidyl ethers of polyhydroxy aromatics, halo-substituted derivatives of such compounds, diepoxy ethers and the like.

Suitable polyepoxides further include the epoxidized esters of polyethylenically unsaturated monocarboxylic acids, such as epoxidized natural poly-unsaturated oils. Another group is the epoxidized esters of unsaturated monohydric alcohols and polycarboxylic acids. Another group is the epoxidized esters of unsaturated alcohols and unsaturated carboxylic acids. Another group is the epoxidized derivatives of polyethylenically unsaturated polycarboxylic acids. Another group is the epoxidized polyesters obtained by reaction of an unsaturated polyhydric alcohol and/or unsaturated polycarboxylic acid or anhydride. Another group is the glycidyl esters of polymerized unsaturated long-chain acids, such as dimer acids and trimer acids described hereinafter. Another group is the glycidyl esters of polybasic acids such as phthalic, o-phthalic acid.

Examples of the polymeric polyepoxides suitable for use in the invention include the polyepoxypolyhydroxy polyethers obtained by reacting a polyhydric alcohol or polyhydric phenol with a polyepoxide.

Other polymeric polyepoxide compounds include the polymers and copolymers of the epoxy containing monomers possessing at least one polymerizable ethylenic linkage. When this type of monomer is polymerized in the substantial absence of alkaline or acidic catalyst such as in the presence of heat, oxygen, peroxy compounds, actinic light and the like, it undergoes additional polymerization at the multiple bond leaving the epoxy group uneffected. These monomers may be polymerized with themselves or with other ethylenically unsaturated monomers.

The polyepoxides that are particularly preferred for use in the compositions of this invention are the polyglycidyl ethers and particularly the polyglycidyl polyethers of polyhydric phenols and those of polyhydric alcohols. The polyglycidyl ethers of polyhydric phenols can be obtained by reacting a polyhydric phenol with an excess, e.g., 4 to 10 mole excess, of a halogen-containing epoxide in an alkaline medium.

Epihalohydrin, particularly epichlorohydrin is usually preferred as the halogen-containing epoxide. The halogen-containing epoxides are further exemplified by epibromohydrin, 3-chloro-1,2-epoxybutane, 3-bromo-1,2-epoxyhexane, 3-chloro-1,3-epoxybutane, 3-bromo-1,3-epoxyhexane, 3-chloro-1,2-epoxyoctane and the like.

As polyglycidyl ether of a polyhydric phenol a polyglycidyl ether of 2,2-bis(4-hydroxyphenyl)propane is preferred. Polyglycidyl polyethers of this type may be represented by the general formula:

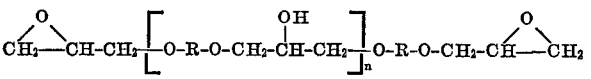

in which R represents the divalent group:

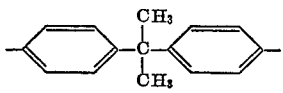

and $n$ has an average value of from 0 to, for instance, 12; during the preparation some of the terminal glycidyl groups may be hydrated to

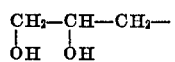

groups by reaction with water.

Preferred are polyglycidyl polyethers of 2,2-bis(4-hydroxyphenyl)propane having a molecular weight of about 340–2000 and an epoxy equivalency of about 170–1200. Particularly preferred are polyglycidyl ethers of 2,2-bis-(4-hydroxyphenyl)propane having a molecular weight of about 700–1000 and an epoxy equivalent weight of about 400–600, in view of the favorable ratio between epoxy groups and free hydroxyl groups.

UNSATURATED AMINES

The ethylenically unsaturated amines which may be used in the present invention may be described by the following formula:

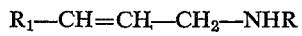

wherein $R_1$ is selected from the group consisting of H—, aromatic radicals such as phenyl, naphthyl and the like, alkyl radicals having from 1–20 carbon atoms, such as, for example, methyl, ethyl, propyl, butyl, amyl, hexyl, heptyl, octyl, decyl, dodecyl, tetradecyl, hexadecyl, octadecyl and aplohexyl radicals and their isomers and alkenyl radicals having from 1–20 carbon atoms such as for example, methylene, propylene, butylene, amylene, hexylene, heptylene and octylene radicals and their isomers, and R is selected from the group consisting of H—, $R_1$—CH=CH—$CH_2$— and any of the radicals of the $R_1$ type. Preferred ethylenically unsaturated amines are allyl amine and di-allyl amine. In addition copolymers of the adduct described below with vinyl monomers may also be used in the present invention.

THE ADDUCT

The ethylenically unsaturated amine-polyepoxide adducts are prepared by reacting the epoxide compound with the ethylenically unsaturated amine under an atmosphere free of oxygen at moderate temperatures, i.e., 40 to 80° C. and preferably 45 to 65° C. for a sufficient time to insure complete formation of the adduct, i.e., ½ to 10 hours and preferably 2–4 hours. Excess (unreacted) unsaturated amine, if any, may be removed by any convenient manner, such as, for example, vacuum distillation. The amount of unsaturated amine which may be used in the present invention varies from excess unsaturated amine, i.e., 10 or more equivalents of unsaturated amine to one equivalent of polyepoxide, to excess polyepoxide, i.e., 1 to 5 equivalents and preferably 1 to 2 equivalents of polyepoxide to unsaturated amine. The reaction may be carried out at atmospheric pressure and at superatmospheric pressures; in the latter case pressures up to 250 p.s.i. may be employed.

CARBOXYLIC ACIDS

Water soluble carboxylic acids which may be used in the present invention are organic acids such as, for example, formic acid, acetic acid, propionic acid, chloropropionic acid, etc., and suitably buffered forms of certain inorganic acids such as, for example, phosphoric acid.

The amount of water soluble carboxylic acid which may be used in the present invention is that amount of acid which will effect aqueous dispersion of the above-described adduct. This amount varies with the amount and composition of the adduct to be used, but may generally be described as ranging from about 5 to 50% by weight of the polyepoxide and preferably 20 to 40% of weight of the polyepoxide.

The coating applied is cured, i.e., cross-linked by conventional curing techniques, preferably in a short time by accelerated drying at elevated temperatures in the range of about 50–250° C. and preferably 75–175° C. for from a few minutes to several hours, and preferably from about 15–60 minutes.

The resulting compositions form excellent films when coated on suitable substrates and especially good films are formed by the process of electrodeposition. Electrodeposition is a process for coating metal articles with an organic film forming material in which the coating is deposited by immersing the articles to be coated in an aqueous composition containing the organic film-forming material and passing an electric current through the coating composition between the article and another electrode. In such an electrodeposition process, the articles are usually connected to the electric current supply and then immersed in the coating composition and a coating of film-forming material is deposited on the surface of the article.

The composition of the present invention may be utilized for a variety of applications. Because of their improved properties, the compositions are ideally suited for use in preparing coatings and sealing compositions. Desired fillers, pigments and stabilizers may also be used.

The present invention may be further described and illustrated with reference to the following examples. It is to be understood that the following examples are for the purpose of illustration and the invention is not to be regarded as limited to any one of the specific compounds or conditions recited therein. Unless otherwise stated, "Parts" is parts by weight.

EXAMPLE I

To 369 parts (6.5 eqv.) of freshly distilled allyl amine, was slowly added 122 parts (0.64 eqv.) of the diglycidyl ether of 2,2-bis(4-hydroxyphenyl)-propane (having an epoxy value of 0.52 eq./100 g.) while the mixture was stirred under nitrogen atmosphere. The mixture was heated to reflux temperature (55° C.) and that temperature was maintained for 3 hours. Thereafter, the mixture was allowed to cool to ambient temperature, excess (unreacted) allyl amine was removed by vacuum distillation at 55–60° C. for one hour at 1 mm. Hg. 167.5 parts of a pale yellow liquid remained; the quantity of allyl amine-polyepoxide adduct which would theoretically be present is 158.7 parts.

10 parts of the above adduct were combined with 2.86 parts glacial acetic acid and 90 parts distilled water. The adduct was completely soluble in the aqueous mixture. The mixture was electrodeposited on steel panels at 25 to 150 volts for 3 minutes and the coated panels were baked at 150° C. for 30 minutes. Satisfactory films were produced, though the films were somewhat soft.

EXAMPLE II 6.4 parts of the allyl amine-polyepoxide adduct produced in Example I was further reacted with 3.6 parts of the diglycidyl ether of 2,2-bis(4-hydroxyphenyl)propane used in Example I for 1 hour at 150° C. The resulting resinous reaction product was combined with 1.8 parts glacial acetic acid and 90 parts distilled water. The resinous reaction product was essentially completely soluble in the aqueous mixture. The solution was electrodeposited on a number of steel panels at 25, 50, 100, 150 and 200 volts for from 2–10 minutes. Satisfactory hard films were produced at 100, 150, and 200 volts, the films at 25 and 50 volts being somewhat thin.

EXAMPLE III

Example III was repeated, except that different ratios of adduct to polyepoxide were used to produce the resinous reaction product. The ratios used were as follows:

| Adduct (A) (parts) | Polyepoxide (B) (parts) | Equivalent ratio A/B |
|---|---|---|
| 6.0 | 4.0 | 4:3 |
| 5.8 | 4.2 | 5:4 |
| 5.7 | 4.3 | 6:5 |
| 6.4 | 3.6 | 3:2 |

NOTE.—Satisfactory films were produced with each of the compositions.

EXAMPLE IV

Example I is repeated, except equivalent amounts of dially amine are used. Related results are achieved.

EXAMPLE V

Example I is repeated except equivalent amounts of crotyl amine are used. Related results are achieved.

EXAMPLE VI

Example I is repeated except equivalent amounts of octodecadienylamine are used. Related results are obtained.

EXAMPLE VII

Example I is repeated except equivalent amounts of dodecadienylamine are used. Related results are obtained.

EXAMPLE VIII

Example I is repeated except equivalent amounts of octadecenylamine are used. Related results are obtained.

I claim as my invention:

1. A curable composition suitable for electrodeposition comprising an aqueous mixture of (1) an adduct of 1 to 5 equivalents of a polyglycidyl ether of a polyhydric phenol and 1 to 10 equivalents of allylamine and (2) a water soluble carboxylic acid.

2. A composition as in claim 1 wherein the polyhydric phenol is 2,2-bis(4-hydroxyphenyl)propane.

References Cited

UNITED STATES PATENTS

| 2,640,037 | 5/1953 | Parry et al. | 260—47 EN |
| 2,717,885 | 9/1955 | Greenlee | 260—47 EN |
| 2,723,241 | 11/1955 | De Groote et al. | 260—47 EN |
| 2,772,248 | 11/1956 | Lieberman et al. | 260—47 EN |
| 2,872,427 | 2/1959 | Schroeder | 260—29.2 EP |

FOREIGN PATENTS

| 1,466,708 | 12/1966 | France | 260—47 EN |

OTHER REFERENCES

Chemical Abstracts, 1968, vol. 68, #40473S.

DONALD J. ARNOLD, Primary Examiner

A. H. KOECKERT, Assistant Examiner

U.S. Cl. X.R.

204—181; 260—29.6 NR, 47 EN, 47 UA, 837